M. FOSSATI.
GEAR WHEEL.
APPLICATION FILED MAR. 22, 1921.
1,390,198.
Patented Sept. 6, 1921.
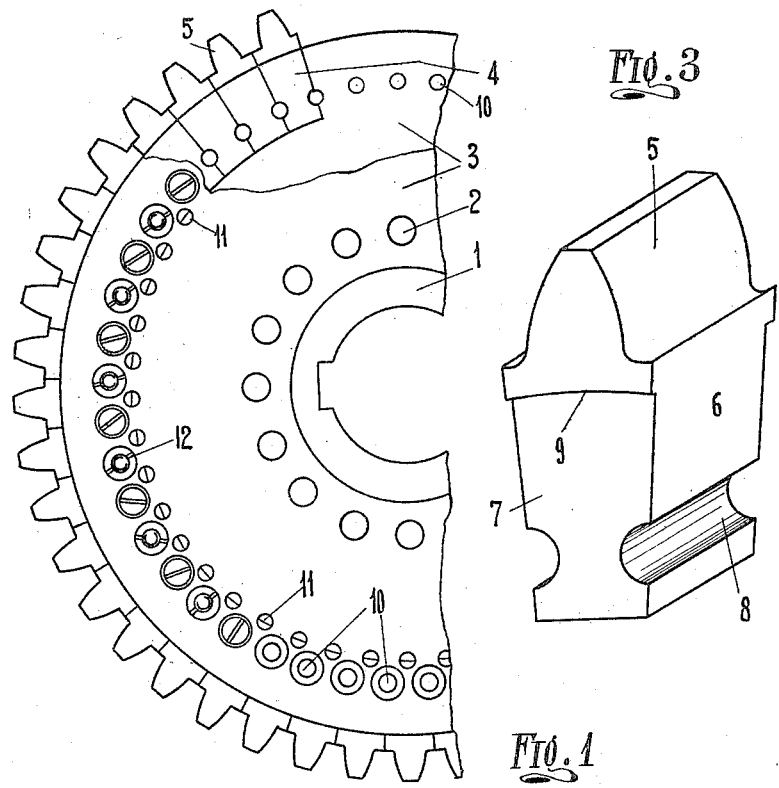
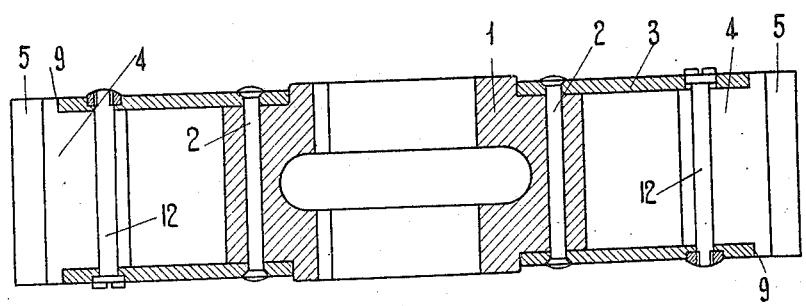
Inventor:
Mario Fossati
By Lawrence Langner
Attorney.

UNITED STATES PATENT OFFICE.

MARIO FOSSATI, OF TURIN, ITALY.

GEAR-WHEEL.

1,390,198.  Specification of Letters Patent.  Patented Sept. 6, 1921.

Application filed March 22, 1921. Serial No. 454,408.

*To all whom it may concern:*

Be it known that I, MARIO FOSSATI, a subject of the King of Italy, and resident of Turin, Italy, have invented certain new and useful Improvements in Gear-Wheels, (for which I have filed application in Italy, August 12, 1919, No. 37,051,) of which the following is a specification.

This invention relates to gear wheels and has for its object a metal toothed wheel in which the teeth are independent from each other as well as from the hub and the body of the wheel.

This invention comprises also the construction of the wheel parts and the means for assembling said parts and the removable teeth.

The annexed drawing shows an embodiment of a wheel according to this invention and Figure 1 is a fragmentary front view; Fig. 2 is a central section and Fig. 3 is the perspective view of a separate tooth removed from the wheel.

As shown by Figs. 1 and 2, the wheel according to this invention comprises a hub 1 adapted to be mounted on a shaft, and two side rings 3—3 which are secured on the opposite flat sides of said hub by means of bolts 2.

Said rings 3—3 together with the hub 1 provide a wheel body having a peripheral recess or hollow in which are located the roots 4 of the teeth 5.

Each tooth member comprises a tooth 5 having any desired shape and outline, and a root portion 4 intended to be engaged between the side rings of the wheel body. The tooth portion 4 has parallel faces 7 adapted to rest against the inner faces of the rings 3—3 and providing a shoulder 9 intended to bear against the circular edge of the adjacent ring 3. The other faces 6 of each tooth lie in planes intersecting at the center of the wheel and the faces 6 of the several teeth contact with each other when the wheel and teeth are assembled.

Each face 6 of the teeth is provided with a channel 8, the channels 8 of the contacting faces 6 of the adjacent teeth coöperating to provide a circular hole.

The side rings 3—3 of the wheel are provided with a circular row of holes 10 at such distance from the ring edges as to register with the holes provided by the channels 8 when the teeth are seated between said rings, and a further circular row of smaller holes 11 is provided in said rings, said holes 11 having their centers nearly in register with the position of the lower edge of the tooth roots when these latters are inserted in position in the wheel body.

For assembling the wheel the rings 3—3 are secured to the hub 1 by means of the bolts 2, and then the several teeth are located in position with their roots 4 engaged between the rings 3.

The teeth are properly located so as the channels 8 of their root register with the holes 10 of the rings and then bolts 12 are inserted through said holes 10 and channels 8 and their nuts are firmly screwed up.

By the described arrangement the teeth are firmly held in operative position as their faces 7 contact with the faces of the adjacent rings 3 which are forced against the teeth roots by the bolts 12 and the shoulders 9 bear on the peripheral edge of the ring 3; further each tooth is clamped between the adjacent ones owing to their inclined contacting surfaces 6.

The gear wheel thus obtained is very strong and may withstand to heavy stresses.

For replacing a tooth when broken, the two bolts 12 adjacent to it are removed from holes 10 and then a suitable tool is inserted in the hole 11 located behind the root of said tooth for driving out this tooth; a conical point tool is preferably used for this purpose, this tool being forced against the tooth which has to be driven out.

Then a spare tooth is inserted in the recess left in the rim and pressure is applied to said tooth for the purpose of driving it in position with its shoulders 9 bearing on the edges of the rings 3; finally the bolts 12 are again locked in position.

It is obvious that by means of rings as 3 of proper size may be produced wheels having different ratios by using always teeth of the same shape and size and therefore the teeth may be manufactured in large number from a metal having the required character, said metal being different from the metal of which is made the wheel body.

The teeth may be obtained by cutting pieces from a bar having the desired shape or contour this bar being obtained by rolling, drawing or by an extruding operation.

The construction according to this invention provides facilities for the manufacture as well as for the assembly and repair of the wheels, because the teeth may be easily obtained by drawing or rolling bars of any desired metal without requiring long cutting operation by means of special machines, and said teeth may be easily replaced in the wheel and may be used for producing wheels of different size.

What I claim as my invention and desire to secure by United States Letters Patent is:—

A toothed wheel comprising a hub, two flanges secured at the sides of said hub and providing an intermediate recess, teeth independent from each other and from said wheel body, each tooth comprising a root portion adapted to be engaged in said recess and provided with shoulders bearing on the edges of said flanges as well as with inclined surfaces provided with recesses and contacting with the similar recessed surfaces of the root portions of the adjacent teeth, the recesses of the adjacent inclined root surfaces coöperating to provide holes, said flanges having holes in register with the holes provided by the said recesses, and bolts inserted in said holes and recesses to removably clamp in position said teeth, said flanges having other holes in register with the bottom surface of the root portion of the teeth for the insertion of means for removing said teeth.

Signed at Turin, Italy.

MARIO FOSSATI.